(12) United States Patent
Attie et al.

(10) Patent No.: US 10,258,914 B2
(45) Date of Patent: Apr. 16, 2019

(54) DEVICE FOR CIRCULATING A GAS IN A CLOSED CIRCUIT

(71) Applicant: COMMISSARIAT A L'ENERGIE ATOMIQUE ET AUX ENERGIES ALTERNATIVES, Paris (FR)

(72) Inventors: David Attie, Paris (FR); Patrick Magnier, Orsay (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/018,201

(22) Filed: Feb. 8, 2016

(65) Prior Publication Data

US 2016/0228806 A1     Aug. 11, 2016

(30) Foreign Application Priority Data

Feb. 9, 2015    (FR) .................................... 15 50987

(51) Int. Cl.
| | |
|---|---|
| *B01D 46/00* | (2006.01) |
| *F04D 29/52* | (2006.01) |
| *F04D 29/70* | (2006.01) |

(52) U.S. Cl.
CPC ....... *B01D 46/0041* (2013.01); *F04D 29/522* (2013.01); *F04D 29/701* (2013.01)

(58) Field of Classification Search
CPC .... B01D 45/12; B01D 45/14; B01D 46/0032; B01D 46/0039; F04D 29/547; F04D 29/545; F04D 13/06; F04D 29/526
See application file for complete search history.

(56) References Cited

U.S. PATENT DOCUMENTS

| | | | | |
|---|---|---|---|---|
| 297,028 | A | * 4/1884 | Stainfield | ............... B01D 45/14 |
| | | | | 165/119 |
| 1,319,059 | A | * 10/1919 | Funk | ...................... B01D 45/14 |
| | | | | 55/404 |

(Continued)

FOREIGN PATENT DOCUMENTS

WO    WO 2014/204412 A2    12/2014

OTHER PUBLICATIONS

French Search Report as issued in French Patent Application No. 1550987, dated Dec. 1, 2015.

*Primary Examiner* — Duane Smith
*Assistant Examiner* — Brit E. Anbacht
(74) *Attorney, Agent, or Firm* — Pillsbury Winthrop Shaw Pittman LLP

(57) ABSTRACT

A device for circulating a gas in a closed circuit, has an upstream end and a downstream connected to the circuit, the device including: a first chamber defining a first internal volume and having an at least partially conical shape having a minimum diameter situated at a level of the upstream end; a second chamber defining a second internal volume and positioned downstream of the first chamber and having an at least partially conical shape having a minimum diameter situated at a level of the downstream end; an impeller including blades arranged regularly around an axis of rotation, the impeller positioned between the first and second chambers; and a rotation device to rotate the impellers. The first internal volume is larger than the second internal volume. The conical shape of the first chamber has an angle ($\alpha_A$) smaller than the angle ($\alpha_B$) of the conical shape of the second chamber.

6 Claims, 1 Drawing Sheet

(56) References Cited

U.S. PATENT DOCUMENTS

| | | | | |
|---|---|---|---|---|
| 1,502,862 A | * | 7/1924 | Menk | F04D 29/526 237/50 |
| 1,632,357 A | * | 6/1927 | White | F04D 1/06 310/67 R |
| 2,560,874 A | * | 7/1951 | Kelso | B01D 45/14 55/408 |
| 2,898,030 A | * | 8/1959 | Hull | F04D 29/526 417/360 |
| 3,412,928 A | * | 11/1968 | Hull | F04D 29/023 29/463 |
| 4,044,750 A | * | 8/1977 | Zeigler | F04D 29/526 126/25 B |
| 4,071,336 A | * | 1/1978 | Yamine | B01D 53/26 55/406 |
| D276,941 S | * | 12/1984 | Stansbury, Jr. | D28/13 |
| D281,360 S | * | 11/1985 | Wistrand | D28/13 |
| 4,734,017 A | * | 3/1988 | Levin | A47L 5/24 15/344 |
| D316,651 S | * | 5/1991 | Williams | D7/416 |
| 5,332,355 A | * | 7/1994 | Lyda, Jr. | F04D 1/04 415/218.1 |
| 5,452,713 A | * | 9/1995 | Vipond | F04D 29/545 128/202.27 |
| 5,649,419 A | * | 7/1997 | Schaut | F02C 7/045 181/214 |
| 5,725,356 A | * | 3/1998 | Carter | F04D 25/08 416/240 |
| 6,699,012 B1 | * | 3/2004 | Lin | F04D 13/06 415/202 |
| D518,919 S | * | 4/2006 | Parodi | D28/13 |
| 2002/0073666 A1 | * | 6/2002 | Cutler | B01D 46/002 55/482 |
| 2003/0091363 A1 | * | 5/2003 | Hoffman | G03G 21/203 399/92 |
| 2004/0256181 A1 | * | 12/2004 | Durand | B66B 13/08 187/316 |
| 2005/0022549 A1 | | 2/2005 | Anderson et al. | |
| 2006/0073784 A1 | * | 4/2006 | Porter | F24F 7/065 454/187 |
| 2007/0277487 A1 | * | 12/2007 | Thurin | B01D 46/0028 55/471 |
| 2011/0113755 A1 | * | 5/2011 | Kim | B01D 46/0005 60/275 |
| 2015/0098818 A1 | * | 4/2015 | Leesman | F04D 29/164 415/228 |

* cited by examiner

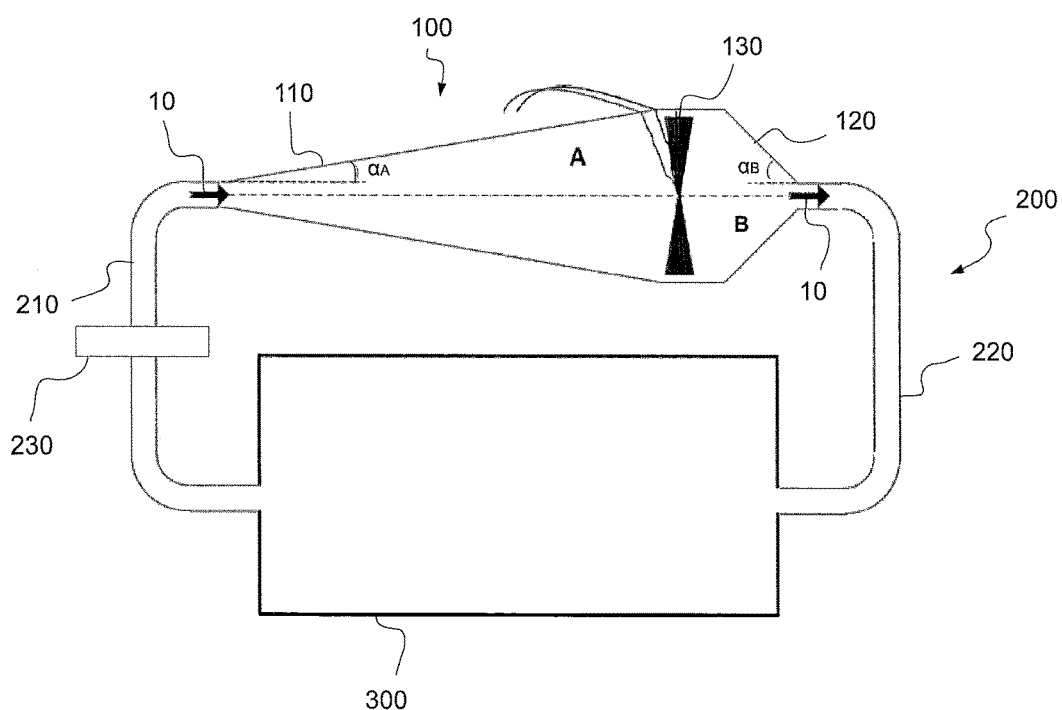

DEVICE FOR CIRCULATING A GAS IN A CLOSED CIRCUIT

CROSS-REFERENCE TO RELATED APPLICATIONS

This application claims priority to French Patent Application No. 1550987, filed Feb. 9, 2015, the entire content of which is incorporated herein by reference in its entirety.

FIELD

The present invention relates to a device for circulating a gas in a closed circuit, with a view for example to filtering it or purifying it.

BACKGROUND

In a closed circuit, i.e. leak tight with respect to the exterior, a gas is generally set in motion by means of an electric pump which can cooperate with a reservoir.

Yet in certain particular applications requiring a reliable, compact system and of low electrical consumption, such as for example for the filtration of a chamber of a satellite, the use of this type of heavy pump (several tens of kilos), bulky and consuming of electrical energy is not absolutely suited.

SUMMARY

In this context, an aspect of the present invention aims to propose a device for circulating a gas in a closed circuit which is compact, light, clean and of low electrical consumption which could for example be used in aerospace applications, particularly for chamber and reservoir filtration or purification.

To this end, an aspect of the invention relates to a device for circulating a gas in a closed circuit, the device having a first upstream end and a second downstream end suited to be connected to the circuit; the device including:
  a first chamber (A) defining a first internal volume and having an at least partially conical shape having a minimum diameter situated at the level of the upstream end and connected to the circuit;
  a second chamber (B) defining a second internal volume, the second chamber (B) being positioned downstream of the first chamber (A) and having an at least partially conical shape having a minimum diameter situated at the level of the downstream end connected to the circuit;
  an impeller comprising several blades arranged regularly around an axis of rotation; the impeller being positioned between the first chamber (A) and the second chamber (B);
  a rotation device configured to rotate the axis of rotation setting in motion the impeller;
the internal volume of the first chamber (A) being larger than the internal volume of the second chamber (B);
the conical shape of the first chamber (A) is characterised by an angle ($\alpha_A$) and the conical shape of the second chamber (B) is characterised by an angle ($\alpha_B$), the angle ($\alpha_A$) of the conical shape of the first chamber (A) being smaller than the angle ($\alpha_B$) of the conical shape of the second chamber (B).

It will be noted that the terms "upstream" and "downstream" are defined as a function of the direction of flow of the gas inside the circuit illustrated in FIG. 1 by the references 10.

Thus, the device according to an aspect of the invention makes it possible to dispense with the use of a pump to enable the circulation of a gas in a closed circuit solely due to the rotation of the impeller.

Thus thanks to the invention, it is possible to produce a closed filtration system which is clean, compact, economical and of low electrical consumption compared to existing filtration systems using a pump for setting in motion the gas confined in the circuit.

The device for circulating a gas in a closed circuit according to one or more embodiments of the invention may also have one or more of the characteristics below, considered individually or according to any technically possible combinations thereof:
  the ratio between the internal volume of the first chamber (A) and the internal volume of the second chamber (B) is greater than or equal to 2;
  the rotation device configured to rotate the impeller are formed by a low voltage electric motor;
  the rotation device configured to rotate the impeller is positioned in the internal volume of the device.

Another aspect of the invention is also a system for filtering a gas of a closed circuit, the system including:
  a device for circulating the gas according to an embodiment of the invention;
  a chamber comprising a volume of gas to filter;
  connection piping making it possible to connect the chamber to the circulation device;
  a filtration system configured to filter the gas of the circuit.

In an embodiment, the filtration system is a permanent filter suited to filtering the gas of the circuit.

BRIEF DESCRIPTION OF THE FIGURE

Other characteristics and benefits of the invention will become clearer from the description which is given thereof below, for indicative purposes and in no way limiting, with reference to FIG. 1 schematically illustrating the device for circulating a gas in a closed circuit according to the invention.

DETAILED DESCRIPTION

FIG. 1 illustrates a closed circuit 200 in which a gas is set in motion by a circulation device 100 according to an embodiment of the invention.

The filtration circuit 200 comprises;
  a circulation device 100 for circulating a gas;
  a chamber 300 having a volume of gas to filter or to purify;
  piping 210, 220 for connecting the chamber 300 to the circulation device 100; the piping 210, 220 is connected to the circulation device 100 in a conventional manner, typically by welded connections;
  a filtration system 230, as a filter.

The circulation device 100 according to an embodiment of the invention is formed by two shells 110, 120 made of stainless steel resistant to vacuum and to very high pressure, that is to say at least up to 200 bars. The two shells 110, 120 are assembled together by ad hoc means formed for example by a set of ferrules and tightening bolts, such that the connection is leak tight and withstands the required pressures. The two shells 110, 120 thus delimit the external envelope of the device 100.

The assembled two shells 110,120 delimit:
- a first internal chamber A defining a first internal volume illustrated in FIG. 1;
- a second internal chamber B defining a second internal volume illustrated in FIG. 1.

In an embodiment, the first chamber A of the circulation device 100 has an internal volume greater than the internal volume of the second chamber B. This difference in volume thus makes it possible to facilitate the creation of a pressure difference in the circuit for initiating and maintaining the circulation of gas in the circuit.

In an embodiment, the ratio between the volume of the first chamber A and the second chamber B is greater than or equal to two.

The chamber A and the chamber B define an overall internal volume of which the geometry is optimised to facilitate the circulation of gases between the device 100 and the connection piping 210, 220. Thus, the chamber A is of essentially conical shape having a small diameter and a large diameter, the small diameter being positioned at the level of the upstream piping 210. The chamber B is also of partially conical shape having a small diameter and a large diameter, the small diameter being positioned at the level of the downstream piping 220.

According to a downgraded embodiment of the invention, a single of the two chambers of the device has a conical shape. Beneficially, in this embodiment, it is desirable to arrange the conical shape at the level of the first inlet chamber A for the flow of gas so as to minimise turbulences at the level of the impeller 130.

In order to facilitate the flow of gas in the circulation device 100 and so as to minimise head losses through friction on the inner walls of the two shells 110, 120, the geometry of the internal volumes of the device is suited so as to obtain a regime the least turbulent possible. To do so, the dimensions and the shape of the device 100 will be suited so as to minimise friction and so as to obtain a flow inside the device 100 characterised by a Reynolds number as small as possible, and ideally less than 3000.

It will be recalled that the Reynolds number is given by the following formula:

$$R_e = \frac{\rho \cdot V \cdot D}{\mu}$$

with:
V: characteristic velocity of the fluid (m/s)
$\rho$: density of the fluid (kg/m$^3$)
D: the inlet or outlet diameter of the device (m)
$\mu$: dynamic viscosity of the fluid (kg/(m·s))

Thus in an embodiment aiming to optimise the kinematic viscosity, the inlet cone of the device 100 formed by the first chamber A has an angle $\alpha_A$ smaller than 10°, and the outlet cone of the device 100 formed by the second chamber B has an angle $\alpha_B$ of the order of 40°.

In a second embodiment aiming to maximise the flow rate, it is sought to minimise the inlet and outlet diameter of the device 100.

The circulation device 100 further comprises an impeller device 130 comprising a plurality of blades set in motion by a low voltage electric motor (not represented). To this end, it is provided that the device 100 comprises, at the level of one of these two shells 110, 120, a bulkhead crossing that is leak tight to a vacuum and to the pressure required for the passage of low voltage supply cables of the electric motor.

In an embodiment, the electric motor is supplied by a low voltage supply of the order of 3 to 12 volts.

According to an embodiment of the invention the electric motor is confined in a leak tight casing so as to minimise pollution of the flow of air passing through the device 100.

The impeller device 130 is positioned between the first chamber A and the second chamber B in an intermediate zone situated between the two conical parts of the two chambers A and B. At the level of the positioning of the impeller 130, the external envelope of the device 100 has a substantially cylindrical shape so as to enable the positioning and the rotation of the impeller device 130.

It is provided to dimension the circulation device 100 according to an embodiment of the invention so that the radial ends of the blades of the impeller 130 lap against the inner wall of the envelope of the device 100 so as to minimise the presence of dead volume in the device 100.

In an embodiment, the device 100 is dimensioned so that the external diameter of the impeller 130 is greater than the diameter of the connection tubes of the circuit.

According to an embodiment aiming to maximise the flow rate of the gas, it is sought to maximise the diameter of the impeller 130.

The device 100 for circulating a gas according to an embodiment of the invention makes it possible to be integrated in a closed circuit, such as for example a circuit for filtration or purification of a chamber 300. In this case, the circuit has a filtration element 230. In an embodiment, the filtration element 230 is a permanent filter positioned at the inlet or at the outlet of the chamber 300 to filter or to purify.

The device 100 is made with materials selected and chosen as a function of the type of application. In an embodiment, the materials used have the property of being inert in contact with the gas of the circuit so as to avoid any needless pollution of the gas.

So as to optimise further the pressure difference inside the closed circuit and so as to increase the flow rate of the gas in the circuit, it is also envisaged to use a system configured to heat and/or cool the gas circulating inside the closed circuit so as to create a natural circulation of the gas by convection in addition to the circulation of the gas created by the device according to the invention. The system to heat and/or cool the gas may be integrated in the circulation device 100 or positioned on the connection piping of the circuit. Nevertheless, the system to heat and/or cool the gas will be used mainly for applications that need an important flow rate and efficiency, the system to heat and/or cool being consuming of electrical energy, the circulation device 100 according to the invention aiming on the contrary to minimise the electrical input required to fulfil a function of filtration of a leak tight chamber.

The invention claimed is:

1. A circulation device for circulating a gas in a closed circuit, said device having a first upstream end and a second downstream end suited to be connected to said closed circuit, said device comprising:
    a first chamber defining a first internal volume communicating with said downstream end, and having an at least partially conical shape having a minimum diameter situated at a level of said first upstream end connected to said circuit;
    a second chamber defining a second internal volume communicating with said downstream end, said second chamber being positioned downstream of said first chamber and having an at least partially conical shape having a minimum diameter situated at a level of said second downstream end connected to said circuit;

an impeller comprising several blades arranged regularly around an axis of rotation; said impeller being positioned between said first chamber and said second chamber;

a rotation device configured to rotate said axis of rotation setting in motion said impeller, the impeller being configured and arranged such that rotation of the impeller moves gas from the first chamber to the second chamber solely due to the rotation of said impeller;

wherein the first internal volume of the first chamber is larger than the second internal volume of the second chamber so as to create a pressure difference in the closed circuit for initiating and maintaining the flow of gas in the circuit between the first chamber and the second chamber, and wherein the conical shape of the first chamber is characterised by an angle ($\alpha_A$) and the conical shape of the second chamber is characterised by an angle ($\alpha_B$), the angle ($\alpha_A$) of the conical shape of the first chamber being smaller than the angle of the conical shape of the second chamber.

2. The circulation device for circulating a gas in a closed circuit according to claim 1, wherein a ratio between the first internal volume of the first chamber and the second internal volume of the second chamber is greater than or equal to 2.

3. The circulation device for circulating a gas in a closed circuit according to claim 1, wherein the rotation device configured to rotate said impeller are formed by a low voltage electric motor.

4. The circulation device for circulating a gas in a closed circuit according to claim 1, wherein the rotation device configured to rotate said impeller are positioned in the internal volume of said device.

5. A system for filtering a gas of a closed circuit, wherein said system comprises:

a circulation device for circulating said gas according to claim 1;

a chamber comprising a volume of gas to filter;

connection piping making it possible to connect said chamber to said circulation device;

a filtration system configured to filter said gas of the closed circuit.

6. The system for filtering a gas of a closed circuit according to claim 5, wherein said filtration system is a permanent filter configured to filter said gas of said circuit.

* * * * *